United States Patent [19]

Block

[11] 4,144,185

[45] Mar. 13, 1979

[54] METHOD AND COMPOSITION FOR REMOVING CALCIUM SULFATE SCALE DEPOSITS FROM SURFACES

[75] Inventor: Jacob Block, Rockville, Md.

[73] Assignee: The United States of America as represented by the Secretary of the Interior, Washington, D.C.

[21] Appl. No.: 880,831

[22] Filed: Feb. 24, 1978

[51] Int. Cl.$^2$ .......................... C02B 5/06; C02B 5/02
[52] U.S. Cl. ...................................... 252/180; 252/82; 252/89 R; 210/58
[58] Field of Search ......................... 252/180, 82, 89; 210/58

[56] References Cited

U.S. PATENT DOCUMENTS

| 3,660,287 | 5/1972 | Quattrini | 252/82 |
| 3,684,720 | 8/1972 | Richardson | 252/82 |

Primary Examiner—Mayer Weinblatt
Attorney, Agent, or Firm—William S. Brown; Donald A. Gardiner

[57] ABSTRACT

A method and composition for removing calcium sulfate scale deposits from surfaces, such as reverse osmosis membranes and electrodialysis stacks, wherein the surface to be cleaned is contacted by an aqueous solution comprising a chelating agent, a soluble carbonate and a fluorocarbon surfactant.

2 Claims, No Drawings

METHOD AND COMPOSITION FOR REMOVING CALCIUM SULFATE SCALE DEPOSITS FROM SURFACES

BACKGROUND OF THE INVENTION

1. Field of the invention

This invention relates generally to the cleaning of surfaces upon which scale deposits of alkaline earth metal sulfates have accumulated. More particularly, the invention comprises an improved method and composition for removing gypsum or calcium sulfate scale deposits from a variety of surfaces such as components from separation devices, including reverse osmosis membrane modules and electrodialysis stacks.

2. Description of the Prior Art

The prior art has recognized the problems involved with the accumulation of alkaline earth metal sulfate deposits in the form of scales on the surfaces of apparatus and equipment that are involved in handling water. Such scale deposits normally include varying amounts and mixtures of sulfates and carbonates of calcium, magnesium and barium.

These scale deposits are well known in apparatus such as producing oil wells, water injection wells, and in industrial equipment such as heat exchangers, steam and hot water boilers, condensers, flow lines, treaters, cooling towers, internal combustion engines and associated equipment.

Scale deposits of calcium sulfate or gypsum also accumulate and present a clogging problem in certain separation equipment, such as electrodialysis stacks and reverse osmosis membrane modules having semi-permeable membranes of cellulose acetate.

The prior art has recognized several methods for removing calcium sulfate scale deposits from surfaces. For example, strong concentrations of alkali metal hydroxides, such as sodium hydroxide or potassium hydroxide, have been used to effect prolonged contact with the scale deposits so that the latter can be converted to calcium hydroxide, another water insoluble material. The caustic solution must be continuously circulated over the scale encrusted surface and the reaction is frequently not complete because of the occluding nature of the hydroxide conversion product. This secondary insoluble calcium hydroxide product must be subsequently contacted with hydrochloric acid in order to produce water soluble calcium chloride which may then be removed by dissolving it in an aqueous solution.

Calcium sulfate scale deposits have also been removed by utilizing ammonium bicarbonate. However, as with strong caustic solutions, the ammonium bicarbonate converts the sulfate scale into another insoluble product, calcium carbonate. The latter must subsequently be contacted with an acid, such as hydrochloric acid, before it can be removed by dissolving in water. The rate at which the ammonium bicarbonate converts the calcium sulfate scale decreases in ratio to the amount of conversion product because of the occlusion which occurs on the scale surface. Accordingly, removal of the scale deposits is frequently incomplete and the efficiency of this method cannot be appreciably increased even if the ammonium bicarbonate solution is continually recirculated over the scale encrusted surface.

Another method presently known in the prior art for removing calcium sulfate scale deposits involves the use of solutions of alkaline chelating or sequestering agents such as ethylenediamine tetraacetic acid (EDTA), its tetrasodium salt, and nitrilo triacetic acid trisodium salt. These solutions are maintained at substantially higher than ambient temperature and must remain in contact with the scale for extended periods of time. However, the chelation or dissolution of the scale is generally slow and lacks the efficiency required for industrial applications.

The prior art has further recognized that an aqueous solution of an amino polyacetic acid and a carbonate, such as ammonium carbonate, ammonium bicarbonate, sodium carbonate, sodium bicarbonate, potassium carbonate and potassium bicarbonate, provides a more efficient calcium sulfate scale removal composition. It is thought that the aminopolyacetic acid reacts with the calcium ions in solution and forms a chelated species. This causes more calcium sulfate to dissolve, and also results in the release of hydrogen ion from the calcium polyacetic acid chelate. This released hydrogen ion reacts with the bicarbonate forming $CO_2$ gas, which then aids in the scale break-up. In addition, surface active agents have been employed in such compositions, particularly where the scale includes an oily material.

Examples of these aforementioned prior art techniques for removing sulfate and bicarbonate scale deposits, as well as other known techniques, are disclosed by the Gardner et al U.S. Pat. No. 3,639,279; Quattrini U.S. Pat. No. 3,660,287; Richardson U.S. Pat. No. 3,684,720; Thompson U.S. Pat. No. 3,793,209; and Moore et al U.S. Pat. No. 3,956,171.

SUMMARY OF THE INVENTION

The present invention provides an improved method and composition for the removal of calcium sulfate or gypsum scale deposits from surfaces by contacting the deposits with an aqueous solution comprising a chelating or sequestering agent in the form of a polyamino carboxylic acid, a soluble carbonate or bicarbonate and a fluorocarbon surfactant. The solution is permitted to contact and react with the deposits at a pH of approximately 6 to 10 and at ambient or higher temperatures, depending upon the sufficiency of the reaction rate. The concentration of the polyamino carboxylic acid can be from a minimum of 1% to maximum solubility, the concentration of the carbonate is based upon the concentration of the polyamino carboxylic acid and may be on the order of one mole of carbonate to one mole of acid, and the concentration of the fluorocarbon surfactant can be 0.002 weight percent or above.

DETAILED DESCRIPTION OF THE PREFERRED EMBODIMENTS

The removal of calcium sulfate or gypsum scale deposits by utilizing only a chelating agent, such as EDTA (ethylenediamine tetraacetic acid), is normally a rather slow procedure since the EDTA attacks the deposits very slowly. However, the rate of this reaction can be greatly increased by combining the EDTA with a carbonate, such as sodium bicarbonate, thereby increasing the rate of calcium sulfate dissolution to nearly twice that with EDTA alone. The mechanism of this reaction can be described as follows:

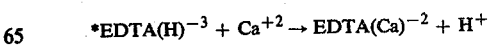

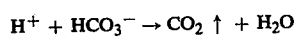

*at pH 7-8, EDTA is primarily in this form.

The carbon dioxide released by this reaction causes the scale deposits to break apart and thereby expose additional deposit surfaces which are more readily attacked by the EDTA.

It has now been discovered that the addition of particular surfactants i.e., fluorocarbon surfactants, to the EDTA-carbonate solvent solution serves to impart a rate of sulfate deposit dissolution that is substantially greater than the rate presently achievable with either EDTA by itself or EDTA in combination with a carbonate, with or without other surfactants.

Fluorocarbon surfactants, i.e., surfactants containing fluorocarbon radicals, in general have been found to be effective for use in the invention, with anionic fluorocarbon surfactants providing the greatest improvement in the extent and rate of sulfate deposit dissolution. Particularly effective surfactants have been found to be a lithium carboxylate derivative of the formula $F(CF_2CF_2)_n(CH_2)_2S(CH_2)_2COOLi$, and an ammonium phosphate derivative of the formula $[F(CF_2CF_2)_n(CH_2)_2O]_xPO(ONH_4)_y$, where n = 3, 4 or 5, x = 1 or 2 and y = 2 or 1.

The soluble carbonate may include any soluble carbonate or bicarbonate, such as $(NH_4)HCO_3$, $NaHCO_3$, $KHCO_3$, $Na_2CO_3$, $(NH_4)_2CO_3$, $K_2CO_3$ and mixtures thereof.

The chelating agent may be any suitable polyamino carboxylic acid such as EDTA, NTA (nitrilo triacetic acid), DTPA (diethylenetriamine pentaacetic acid), HEDTA (N-hydroxyethylethylenediamine triacetic acid), and mixtures thereof.

It has been found that the concentration of the fluorocarbon surfactant in the overall composition of the invention can be a minimum of approximately 0.002 weight percent. The preferred concentration is between approximately 0.005 and 0.01 weight percent. The optimum pH of the composition is between approximately 6 and 10.

The dissolution of the sulfate scale deposits can be achieved at a temperature of ambient or above, depending upon the reaction desired and the nature of the surface being cleaned. Though higher temperatures may be utilized to increase the reaction rate, such temperature should be below those which may cause damage to certain delicate surfaces such as reverse osmosis membranes and the like.

The concentration of the polyamino carboxylic acid can be from approximately one weight percent to maximum solubility, with the preferred range being approximately 20–25 weight percent.

The carbonate concentration is desirably a minimum of about one mole of carbonate per mole of polyamino carboxylic acid, with a carbonate to acid mole ratio of about 2 being preferred.

A series of tests were conducted to ascertain the effect of various surfactants on the reaction rate of polyamino carboxylic acid and carbonate in the dissolution of calcium sulfate scale deposits. Surfaces in the form of reverse osmosis membranes were scaled with gypsum deposits for the purpose of this experiment. This was achieved by concentrating a 1500 ppm sodium chloride solution saturated with gypsum in test cells until the flux was less than 2 gallons per square foot per day. This situation was achieved in about 24 to 48 hours. The cells were then opened and the brine decanted, after which the scaled membranes were rinsed with 10 ml. of 1500 ppm sodium chloride solution.

The cleaning solution utilized in each test consisted of 10 ml. of 10% EDTA $Na_4 \cdot 4H_2O$, 3.7% $NaHCO_3$ and the surfactant, and had a pH of 8. The solution was allowed to react with the scale deposit for twenty minutes. The solution was then decanted, and the cell rinsed with 10 ml. of 1500 ppm sodium chloride solution. The rinse solution was combined with the used cleaning solution and brought to volume in a 100 ml. volumetric flask. A fresh 10 ml. portion of cleaning solution was added to the cell and the procedure continued until all scale was dissolved. The amount of scale dissolved was determined by a turbidimetric $SO_4^=$ analysis using barium chloride.

In addition to the fluorocarbon surfactants tested, the effects of non-fluorinated surfactants were also observed. This latter group included surfactants sold by the BASF-Wyandotte Company uner the trademark Pluronic and comprised block copolymers of ethylene oxide and propylene oxide of varying ratios, thereby providing a series of from very low to very high HLB (hydrophilelipophile balance). Also tested in this group were Renex 35, sold by ICI America and comprising a urea complex of polyoxyethylene tridecyl ether and Neodol 25-3S, sold by Shell and comprising a sodium salt of a linear primary alcohol ethoxy sulfate.

These tests indicated that the fluorocarbon surfactants exhibited chemical properties which are superior to those of the non-fluorinated surfactants, particularly in the ability of the former group of surfactants to operate effectively at relatively lower concentration levels.

The following Table I is a compilation of the tests conducted with both fluorocarbon and non-fluorinated surfactants. Gypsum dissolved in each test was ascertained during three specific periods, i.e., from 0 to 20 minutes, from 20 to 40 minutes and from 40 minutes to completion. The total amount of gypsum dissolved in each test is also indicated. The surfactants designated in the table as "Li carboxylate" and "$NH_4$ phosphate" were, respectively, the above-defined lithium carboxylate and ammonium phosphate fluorocarbon compounds.

Table I

| surfactant | Concentration (wt. %) | Type | HLB | Gypsum Dissolved (mg) 0–20 Min | 20–40 Min | 40 Min.–Completion | Total |
|---|---|---|---|---|---|---|---|
| None | — | — | — | 80 | 57 | 112 | 249 |
| " | — | — | — | 85 | 42 | 0 | 127 |
| Pluronic L81 | 0.5 | Nonionic | 2 | 99 | 30 | 0 | 129 |
| " | 0.5 | " | 2 | 112 | 89 | 179 | 380 |
| " | 0.1 | " | 2 | 99 | 43 | 0 | 142 |
| Pluronic L92 | 0.5 | Nonionic | 5.5 | 60 | 70 | 311 | 441 |
| Pluronic L64 | 0.5 | Nonionic | 15 | 89 | 39 | 0 | 123 |
| Pluronic F68 | 0.5 | Nonionic | 29 | 72 | 64 | 13 | 149 |
| Renex 35 | 0.5 | Nonionic | 14.5 | 82 | 50 | 29 | 161 |
| Neodol 25-3S | 0.5 | Anionic | — | 63 | 58 | 72 | 193 |
| Li carboxylate | 0.01 | Anionic | — | 106 | 113 | 3 | 222 |
| " | 0.01 | " | — | 120 | 138 | 83 | 341 |

Table I-continued

| surfactant | Concentration (wt. %) | Type | HLB | Gypsum Dissolved (mg) | | | Total |
|---|---|---|---|---|---|---|---|
| | | | | 0–20 Min | 20–40 Min. | 40 Min.–Completion | |
| " | 0.01 | " | — | 108 | 197 | 224 | 529 |
| $NH_4$ phosphate | 0.01 | Anionic | — | 90 | 116 | 125 | 331 |

As can be seen from Table I, the total amount of scale deposit present, and dissolved, by each test varied from 127 milligrams to 529 milligrams. The more effective surfactants appeared to function by increasing the penetration of the EDTA-carbonate solution into the scale deposits. This resulted in quicker dissolution since the scale surface on the membrane side was observed to be very vulnerable to EDTA attack, whereas the scale on the brine side was quite resistant to attack. Based upon the results of the tests after 20 minutes, it is seen that the fluorocarbon surfactants were generally the most effective.

The results after 40 minutes are more indicative of general surfactant effectiveness since there is usually an induction period of about 5 to 15 minutes before surfactants begin to work. It can be generally concluded from Table I that the fluorocarbon surfactants, particularly the lithium carboxylate derivative, are significantly more effective and efficient in dissolving gypsum than the non-fluorinated surfactants as a whole.

Minimum effective concentrations were determined for the lithium carboxylate derivative and Pluronic L81. For the former, the minimum concentration is equal to or less than 0.005 weight percent, but greater than 0.001 weight percent. The minimum concentration for Pluronic L81 is equal to or less than 0.1 weight percent, but greater than 0.05 weight percent. The results of these tests are tabulated in Table II. The superiority of the fluorocarbon surfactant at low concentrations is evident from this data.

Table II

| Dosage (wt. %) | 0–20 min. | 20–40 min. | 40 min.–Completion | Total |
|---|---|---|---|---|
| A. Li carboxylate | | | | |
| 0.01 | 106 | 113 | 3 | 222 |
| 0.01 | 120 | 138 | 83 | 341 |

Table II-continued

| Dosage (wt. %) | 0–20 min. | 20–40 min. | 40 min.–Completion | Total |
|---|---|---|---|---|
| 0.01 | 108 | 197 | 224 | 529 |
| 0.005 | 108 | 152 | 108 | 368 |
| 0.001 | 70 | 62 | 260 | 392 |
| B. Pluronic L81 | | | | |
| 0.5 | 99 | 30 | 0 | 129 |
| 0.5 | 112 | 89 | 179 | 380 |
| 0.01 | 99 | 43 | 0 | 142 |
| 0.05 | 78 | 53 | 107 | 238 |

It is to be understood that the forms of the invention herewith described are to be taken as preferred examples of the same, and that various changes may be resorted to without departing from the spirit of the invention or scope of the subjoined claims.

I claim:

1. A composition for removing calcium sulfate scale deposits from surfaces consisting essentially of an aqueous solution of about one weight percent to maximum solubility of a polyamino carboxylic acid selected from the group consisting of ethylenediamine tetracetic acid, nitrilo triacetic acid, diethylenetriamine pentaacetic acid, N-hydroxyethylethylenediamine triacetic acid, and mixtures thereof, a minimum of about one mole of a soluble carbonate per mole of said polyamino carboxylic acid, said carbonate being selected from the group consisting of $(NH_4)HCO_3$, $NaHCO_3$, $KHCO_3$, $Na_2CO_3$, $K_2CO_3$, $(NH_4)_2CO_3$, and mixtures thereof, and from about 0.005 to 0.01 weight percent of an anionic fluorocarbon surfactant selected from the group consisting of compounds of the formulas $F(CF_2CF_2)_n(CH_2)_2S(CH_2)_2COOLi$ and $[F(CF_2CF_2)_n(CH_2)_2O]_xPO(ONH_4)_y$, where n = 3, 4 or 5, x = 1 or 2, and y = 2 or 1.

2. A method for removing calcium sulfate scale deposits from surfaces comprising contacting the deposits with the composition of claim 1.

* * * * *